(12) United States Patent
Yagi et al.

(10) Patent No.: US 8,833,191 B2
(45) Date of Patent: Sep. 16, 2014

(54) CONTROL APPARATUS FOR AUTOMATIC TRANSMISSION

(75) Inventors: Noriyuki Yagi, Wako (JP); Yasushi Inagawa, Wako (JP); Shirou Godai, Wako (JP); Hirotake Omoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 13/476,463

(22) Filed: May 21, 2012

(65) Prior Publication Data

US 2013/0025389 A1 Jan. 31, 2013

(30) Foreign Application Priority Data

May 31, 2011 (JP) ................. 2011-121641
Mar. 12, 2012 (JP) ................. 2012-054511

(51) Int. Cl.
*F16H 3/08* (2006.01)
*F16H 61/688* (2006.01)
*F16H 61/02* (2006.01)
*F16H 3/00* (2006.01)
*F16H 61/28* (2006.01)

(52) U.S. Cl.
CPC .......... *F16H 61/2807* (2013.01); *F16H 61/688* (2013.01); *F16H 2200/006* (2013.01); *F16H 61/0206* (2013.01); *F16H 3/006* (2013.01)
USPC .............................................. 74/331; 74/335

(58) Field of Classification Search
USPC ............................................ 74/330, 331, 335
See application file for complete search history.

(56) References Cited

U.S. PATENT DOCUMENTS

| 5,651,751 | A | * | 7/1997 | Jang ............................... 477/117 |
| 6,343,520 | B1 | * | 2/2002 | Ohashi et al. .................... 74/335 |
| 6,470,763 | B2 | * | 10/2002 | Ohashi et al. .................... 74/335 |
| 7,155,993 | B2 | * | 1/2007 | Koenig et al. .................... 74/331 |

FOREIGN PATENT DOCUMENTS

| JP | 2009-92213 A | 4/2009 |
| JP | 2011-052800 A | 3/2011 |

* cited by examiner

*Primary Examiner* — Ha D Ho
(74) *Attorney, Agent, or Firm* — Westerman, Hattori, Daniels & Adrian, LLP

(57) ABSTRACT

In a control apparatus for an automatic transmission having multiple speeds constituted by four sets and speed selecting mechanisms corresponding to the four sets, assuming the speeds as seven among eight speeds of A to H in order of gear ratio, the four sets are constituted by a first set of A having a largest gear ratio and C that is next but one; a second set including at least H having a smallest gear ratio; a third set of B and D between two of the first set; and a fourth set including two of E, F and G between the second and third sets, and one of first and second pressure regulators selectively supplies hydraulic pressure to two of the mechanisms corresponding to the first and second sets, while the other thereof selectively supplies hydraulic pressure to two of the mechanisms corresponding to the third and fourth sets.

5 Claims, 10 Drawing Sheets

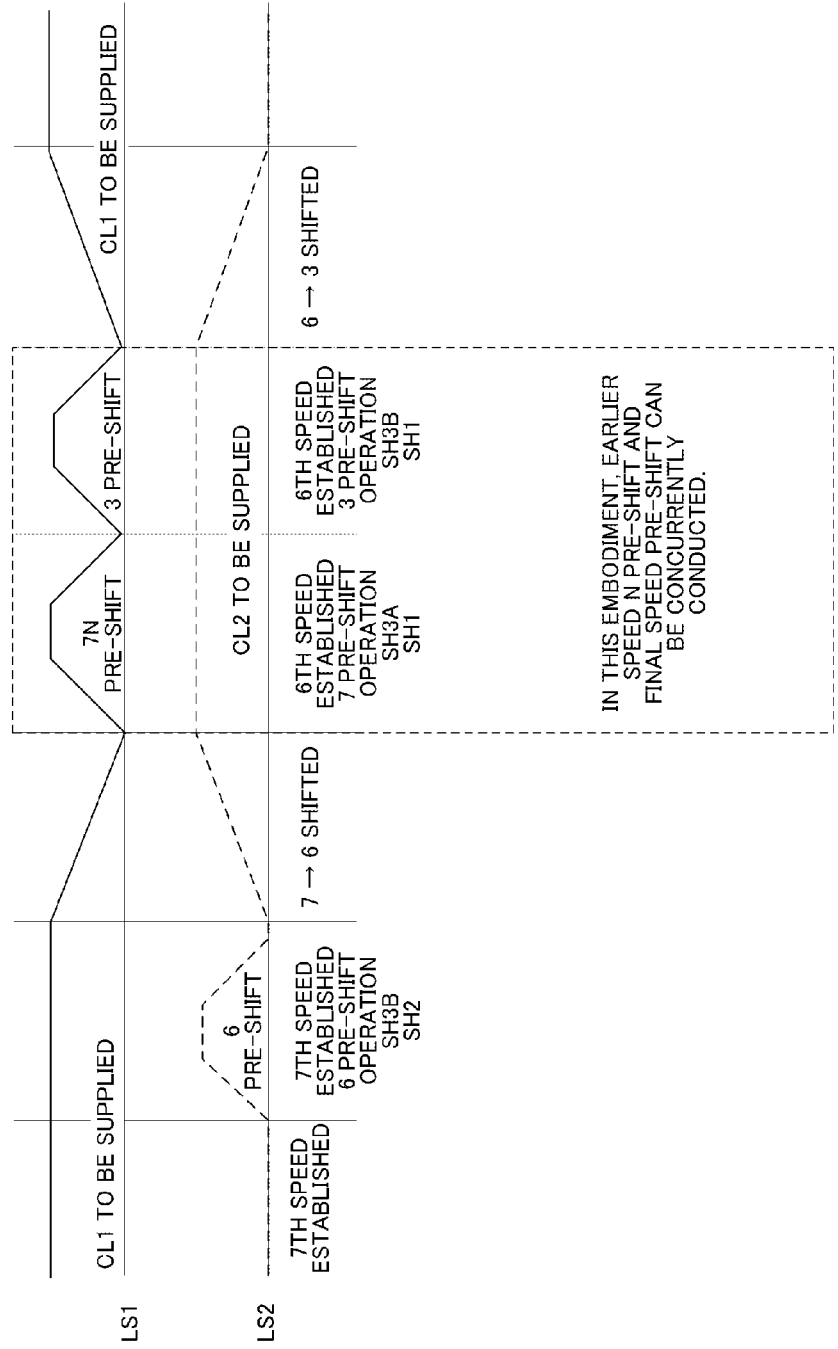

CONTROL APPARATUS FOR AUTOMATIC TRANSMISSION

BACKGROUND

1. Technical Field

An embodiment of the invention relates to a control apparatus for an automatic transmission, specifically, a dual (twin) clutch type automatic transmission.

2. Background Art

One example of a control apparatus for a dual clutch type automatic transmission can be seen in, for example, Japanese Laid-Open Patent Application No. 2011-052800 ('800). The technique disclosed in the reference is provided with the automatic transmission having odd-numbered speeds such as first, third, ... speeds installed between a first input shaft (that is connected to a prime mover mounted on a vehicle through a first clutch CL1) and an output shaft, even-numbered speeds such as second, fourth, ... speeds installed between a second input shaft (that is connected to the prime mover through a second clutch CL2) and the output shaft, and speed selecting mechanisms (synchronizing mechanisms) adapted to select one of the speeds, and with first and second linear solenoid valves LS1, LS2 (electromagnetic control valves; hydraulic pressure regulators) adapted to control hydraulic pressure supply to the first and second clutches CL1, CL2 and speed selecting mechanisms.

In the reference, upon being energized, the first linear solenoid valve LS1 selectively supplies hydraulic pressure to one of the speed selecting mechanisms corresponding to the first clutch CL1 and a set of the odd-numbered speeds, while upon being energized, the second linear solenoid valve LS2 selectively supplies hydraulic pressure to one of the speed selecting mechanisms corresponding to the second clutch CL2 and a set of the even-numbered speeds.

SUMMARY

Recently, in automatic transmissions, the number of speeds is increased to, e.g., eight speeds in response to growing demand. Under this circumstance, when a speed or gear is shifted by retrieving a shifting map using a vehicle speed and accelerator opening, in the case of a conventional transmission having up to five speeds, skip shifting is conducted from the fifth speed to the third speed for example, while in the case of a recent transmission having eight speeds or so, the skip shifting to the fourth speed after continuous change from the eighth speed to the seventh speed or that to the third speed after continuous change from the seventh speed to the sixth speed, may be required.

The case where the skip shifting is carried out in the technique of the reference 1 will be explained with reference to FIGS. 4 to 10. In FIG. 4 onward, the shifting from the seventh speed to the sixth speed and then to the third speed is exemplified.

The reference's technique has, in addition to the first and second linear solenoid valves LS1, LS2, shift valves (direction switching valves) VA1, VA2, VA3A, VA3B equipped with ON/OFF solenoids SH1, SH2, SH3A, SH3B. The shift valves are connected to piston chambers of pistons PSn. (n indicates one of forward speeds of 1 to 7 and reverse speed R) each pair of which is installed to face each other in one of four speed selecting mechanisms (synchronizing mechanisms) shown in the upper portion of the figures.

In a seventh-speed in-gear established condition shown in FIG. 4, a seventh-speed piston PS7 is retained at a seventh-speed in-gear position by a detent (concave) after hydraulic pressure supply is completed and the LS1 on the odd-numbered speed side is energized to supply hydraulic pressure to the first clutch CL1 to engage it.

Next, as shown in FIGS. 5 and 6, while the LS2 on the even-numbered side is energized in addition to the LS1 on the odd-numbered speed side, the SH2 and SH3b are energized to supply hydraulic pressure to a sixth-speed piston PS6 to press it toward the in-gear position to be engaged in a detent, so that a sixth-speed in-gear condition is established (pre-shift operation is conducted).

Next, as shown in FIG. 7, as the LS1 and LS2 remain energized, the SH1 and SH3A are energized to supply hydraulic pressure to a fifth-speed piston PS5 to move the seventh-speed piston PS7 to the neutral (N) position (pre-shift operation is conducted).

Subsequently, as shown in FIG. 8, the SH1 and SH3B are energized to supply hydraulic pressure to a third-speed piston PS3 to press it toward the in-gear position to be engaged in a detent, so that a third-speed in-gear condition is established (pre-shift operation is conducted). As a result, as shown in FIG. 9, clutch-shifting (C-to-C shifting) from the sixth speed to the third speed becomes possible.

However, in the reference 1, since the first linear solenoid valve (LS1) is used for the shifting of the odd-numbered speed and the second linear solenoid valve (LS2) is used for the shifting of the even-numbered speed as mentioned above, when the pre-shift operations of the odd-numbered speeds shown in FIGS. 4 to 9 are continuously conducted, it makes impossible to concurrently conduct the operation (energizing) of the first linear solenoid valve (LS1) as shown in FIG. 10 and therefore, it takes additional time to shift a gear accordingly. Although not illustrated, the same can be said for continuous pre-shift operations of the even-numbered speeds.

An object of an embodiment of the invention is therefore to overcome the foregoing drawback by providing a control apparatus for an automatic transmission that can shorten the time period required for shifting when the pre-shift operations of the odd-numbered (or even-numbered) speeds are continuously conducted.

In order to achieve the object, this invention provides a control apparatus for an automatic transmission having first and second input shafts connected to a prime mover mounted on a vehicle through first and second clutches; at least one output shaft installed in parallel with the first and second input shafts; a plurality of speeds that are installed between the first and second input shafts and the output shaft and are constituted by at least four sets; speed selecting mechanisms provided to correspond to the four sets, each of which is operated upon being supplied with hydraulic pressure to select one of the speeds so that it is moved from a neutral position to select one speed of a set corresponding thereto and engage the selected speed to one of the first and second input shafts and the output shaft; and a hydraulic pressure supply control unit including first and second pressure regulators interposed at a hydraulic pressure circuit connecting a hydraulic pressure source to the speed selecting mechanisms and adapted to selectively supply hydraulic pressure to the speed selecting mechanisms to move them to transmit an output of the prime mover from the first and second input shafts to the output shaft through the selected speed, wherein the improvement comprises that: assuming that the plurality of the speeds as seven speeds among eight speeds of A, B, C, D, E, F, G and H in order of gear ratio from large to small, the four sets are constituted by a first set of A having a largest gear ratio and C that is next speed but one; a second set including at least H having a smallest gear ratio; a third set of B and D positioned between two of the first set; and a fourth set including two of E, F and G positioned between the second and third sets, and one of the first and second pressure regulators selectively supplies hydraulic pressure to two of the speed selecting mechanisms corresponding to the first and second sets, while the other thereof selectively supplies hydraulic pressure to two of the speed selecting mechanisms corresponding to the third and fourth sets.

BRIEF DESCRIPTION OF THE DRAWINGS

The above and other objects and advantages of an embodiment of the invention will be more apparent from the following description and drawings in which:

FIG. 10 is an explanatory view similarly showing the operation of the reference's technique.

DESCRIPTION OF EMBODIMENT

A control apparatus for an automatic transmission according to an embodiment of the present invention will now be explained with reference to the attached drawings.

Figure 1:
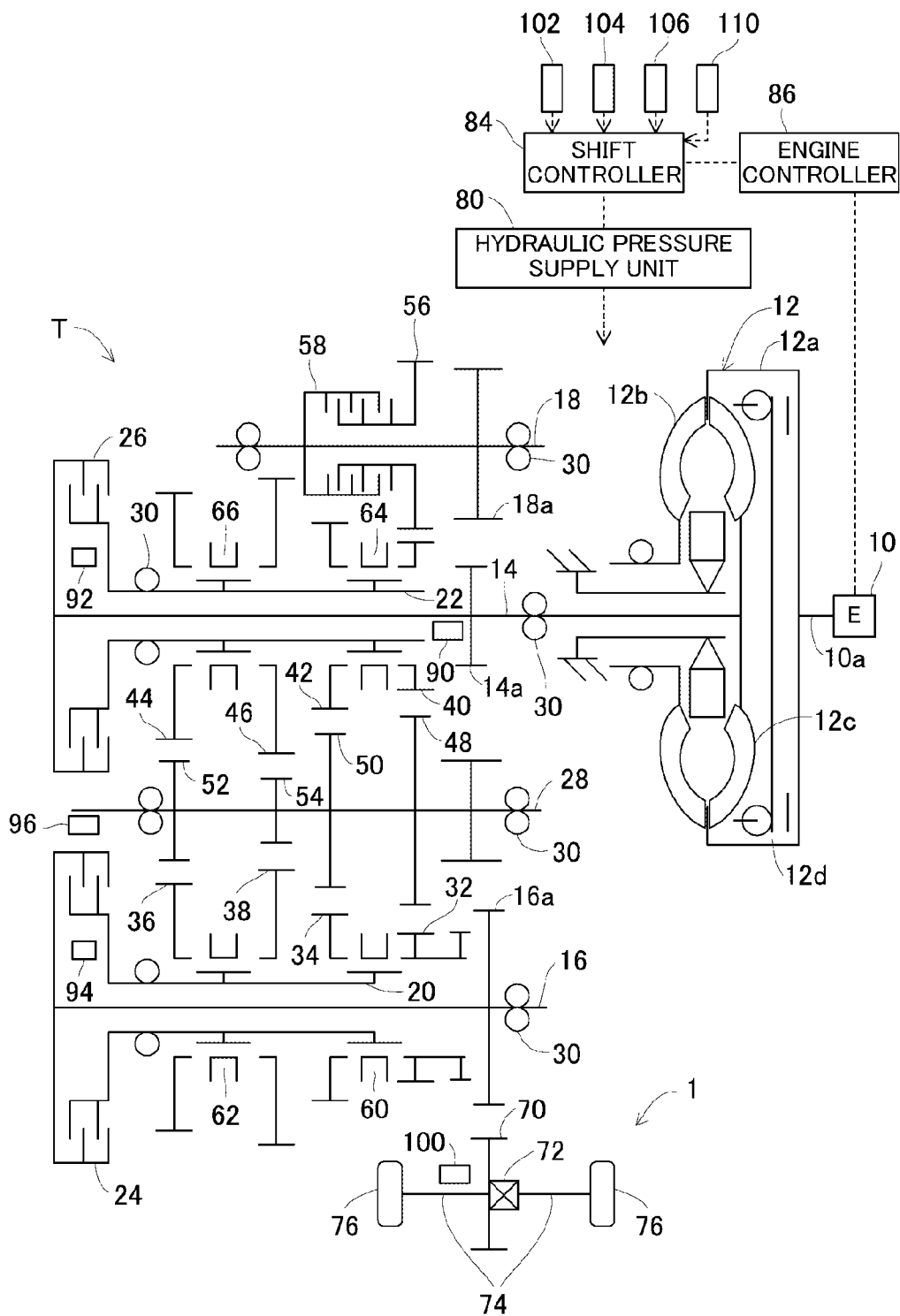
FIG. 1 is an overall schematic view of a control apparatus for an automatic transmission according to an embodiment of this invention.

FIG. 1 is an overall schematic view of a control apparatus for an automatic transmission according to the embodiment of this invention.

In FIG. 1, symbol T indicates the automatic transmission. The transmission T comprises a dual clutch type automatic transmission mounted on a vehicle 1 and having gear positions (gear ratios) of 8 forward speeds and 1 reverse speed. The transmission T has ranges of D, P, R and N.

The transmission T is installed with an even-numbered speed input shaft (hereinafter called "even input shaft") 14 connected via a torque converter 12 to a drive shaft 10a connected to a crankshaft of an engine (prime mover) 10, and an odd-numbered speed input shaft (hereinafter called "odd input shaft") 16 in parallel with the even input shaft 14. The engine 10 comprises, for example, a spark-ignition, gasoline internal combustion engine.

The torque converter 12 has a pump impeller 12b fixed to a drive plate 12a that is directly connected to the drive shaft 10a of the engine 10, a turbine runner 12c fixed to the even input shaft 14, and a lockup clutch 12d, so that the driving force (rotation) of the engine 10 is transmitted to the even input shaft 14 through the torque converter 12.

An idle shaft 18 is installed in parallel with the even and odd input shafts 14, 16. The even input shaft 14 is connected to the idle shaft 18 via gears 14a, 18a and the odd input shaft 16 to the idle shaft 18 via gears 16a, 18a, whereby the even and odd input shafts 14, 16 and idle shaft 18 are rotated by the rotation of the engine 10.

Further, a first secondary input shaft 20 and second secondary input shaft 22 are installed on outer peripheries of the odd and even input shafts 16, 14 to be coaxially therewith and rotated relative thereto, respectively.

The odd input shaft 16 and the first secondary input shaft 20 are interconnected by a first clutch 24, while the even input shaft 14 and the second secondary input shaft 22 by a second clutch 26. The first and second clutches 24, 26 comprise hydraulically-operated multi-plate wet clutches.

An output shaft 28 is disposed between the even and odd input shafts 14, 16 in parallel therewith. The even and odd input shafts 14, 16, idle shaft 18 and output shaft 28 are rotatably supported by bearings 30.

The first secondary input shaft 20 on the odd-numbered speed side is fixed with a first-speed drive gear 32, third-speed drive gear 34, fifth-speed drive gear 36 and seventh-speed drive gear 38, while the second secondary input shaft 22 on the even-numbered speed side with a second-speed drive gear 40, fourth-speed drive gear 42, sixth-speed drive gear 44 and eighth-speed drive gear 46.

The output shaft 28 is fixed with a first-second speed driven gear 48 to be meshed with the first-speed and second-speed drive gears 32, 40, a third-fourth speed driven gear 50 to be meshed with the third-speed and fourth-speed drive gears 34, 42, fifth-sixth speed driven gear 52 to be meshed with the fifth-speed and sixth-speed drive gears 36, 44, and a seventh-eighth speed driven gear 54 to be meshed with the seventh-speed and eighth-speed drive gears 38, 46.

The idle shaft 18 rotatably supports an RVS (reverse) idle gear 56 that is to be meshed with the first-second speed driven gear 48 fixed at the output shaft 48. The idle shaft 18 is connected with the RVS idle gear 56 through an RVS clutch 58. The RVS clutch 58 comprises a hydraulically-operated multi-plate wet clutch similarly to the first and second clutches 24, 26, but the diameter and the number of friction plates of the RVS clutch 58 are smaller than those of the clutches 24, 26.

The odd input shaft 16 is disposed with a first-third speed synch (synchronizing) mechanism 60 that selectively engages the first-speed drive gear 32 or third-speed drive gear 34 with the first secondary input shaft 20 and with a fifth-seventh speed synch (synchronizing) mechanism 62 that selectively engages the fifth-speed drive gear 36 or seventh-speed drive gear 38 with the first secondary input shaft 20.

The even input shaft 14 is disposed with a second-fourth speed synch (synchronizing) mechanism 64 that selectively engages the second-speed drive gear 40 or fourth-speed drive gear 42 with the second secondary input shaft 22 and with a sixth-eighth speed synch (synchronizing) mechanism 66 that selectively engages the sixth-speed drive gear 44 or eighth-speed drive gear 46 with the second secondary input shaft 22. The synch mechanisms 60, 62, 64, 66 are also called "speed selecting mechanisms."

When the first clutch 24 or the second clutch 26 is engaged, the driving force of the engine 10 is transmitted via the odd input shaft 16 to the first secondary input shaft 16 or via the even input shaft 14 to the second secondary input shaft 22, and then transmitted to the output shaft 28 through relevant ones of the aforementioned drive gears and driven gears.

When the vehicle is to be moved backward, the driving force of the engine 10 is transmitted to the output shaft 28 through the even input shaft 14, gear 14a, gear 18a, RVS clutch 58, idle shaft 18, RVS idle gear 56 and first-second speed driven gear 48. The output shaft 28 is connected to a differential mechanism 72 through a gear 70 and the differential mechanism 72 is connected to wheels 76 through drive shafts 74. The vehicle 1 is illustrated with the wheels 76, etc.

The synch mechanisms 60, 62, 64, 66 are operated upon being supplied with hydraulic pressure. A hydraulic pressure supply unit 80 is provided to supply hydraulic pressure to the above synch mechanisms 60, 62, 64, 66, first and second clutches 24, 26 and RVS clutch 58.

Figure 2:
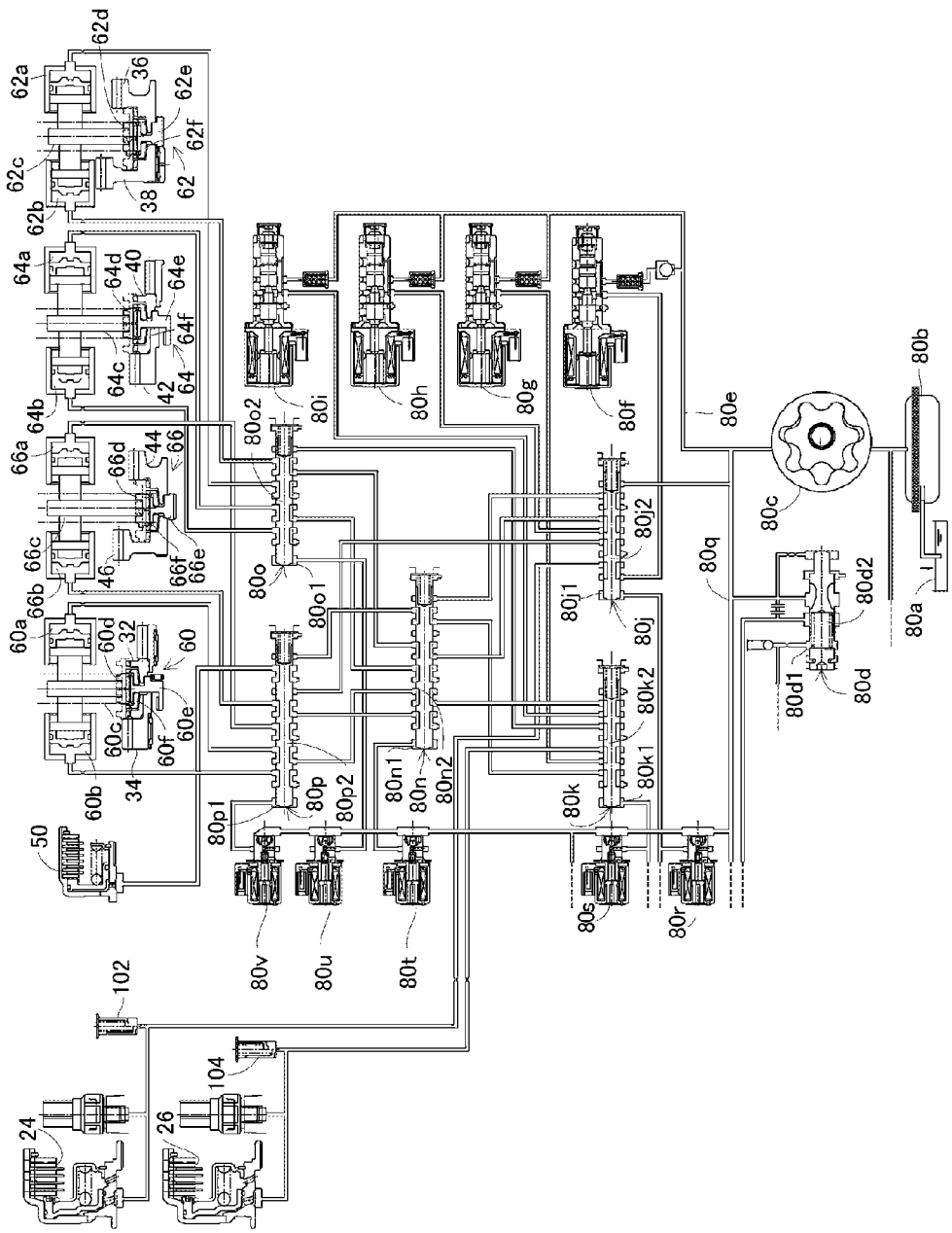
FIG. 2 is a hydraulic pressure circuit diagram showing details of a hydraulic pressure supply unit shown in FIG. 1.

FIG. 2 is a hydraulic pressure circuit diagram showing details of the hydraulic pressure supply unit 80 shown in FIG. 1;

The hydraulic pressure supply unit 80 will be explained with reference to FIG. 2, etc.

In the hydraulic pressure supply unit 80, discharged pressure (hydraulic pressure) of operating oil ATF that is pumped up (drawn) from a reservoir 80a through a strainer 80b by a hydraulic pump (oil transfer pump) 80c, is regulated (decreased) to a level of line pressure by a regulator valve 80d.

Although not illustrated, the hydraulic pump 80c is connected to the pump impeller 12b of the torque converter 12 through a gear so that the hydraulic pump 80c is driven by the engine 10.

The regulated line pressure is sent to input ports of first, second, third and fourth linear solenoid valves (hydraulic control valves (electromagnetic control valves)) 80f, 80g, 80h, 80i.

Each of the first to fourth linear solenoid valves 80f, 80g, 80h, 80i is configured to have the characteristics in which a spool is displaced in proportion to supplied current so as to change output hydraulic pressure to be outputted from its output port linear, and is of N/C (normally-closed) type in which the spool is displaced to the open position upon being supplied with current (being energized).

The output port of the first linear solenoid valve 80f is connected to the first clutch 24 of the odd input shaft 16 through a first clutch shift valve 80j, while the output port of the second linear solenoid valve 80g is connected to a piston chamber of the second clutch 26 of the even input shaft 14 through a second clutch shift valve 80k.

When the first or second clutch 24, 26 is engaged (made ON) upon being supplied with hydraulic pressure, the first or second secondary input shaft 20 or 22 is fastened to the odd or even input shaft 16 or 14. In contrast, when hydraulic pressure is discharged so that the first or second clutch 24, 26 is disengaged (made OFF), the connection between the first or second secondary input shaft 20 or 22 and the odd or even input shaft 16 or 14 is cut off.

The output port of the third linear solenoid valve 80h is connected to a fifth-speed piston chamber 62a and seventh-speed piston chamber 62b of the fifth-seventh speed synch mechanism 62 and also to a second-speed piston chamber 64a and fourth-speed piston chamber 64b of the second-fourth speed synch mechanism 64 through the first clutch shift valve 80j and first and second servo shift valves 80n, 80o.

The output port of the fourth linear solenoid valve 80i is connected to a first-speed piston chamber 60a and third-speed piston chamber 60b of the first-third speed synch mechanism 60 and also to a sixth-speed piston chamber 66a and eighth-speed piston chamber 66b of the sixth-eighth speed synch mechanism 66 through the second clutch shift valve 80k, the first servo shift valve 80n and a third servo shift valve 80p.

Thus, the fourth linear solenoid valve 80i corresponds to the above-mentioned first pressure regulator, the third linear solenoid valve 80h to the second pressure regulator, the first linear solenoid valve 80f to the third pressure regulator, and the second linear solenoid valve 80g to the fourth pressure regulator.

In the synch mechanisms, the above piston chambers 60a and 60b, 62a and 62b, 64a and 64b and 66a and 66b are arranged to face each other, and pistons of each pair are interconnected by a shared piston rod. The piston rod of each pair is connected to a shift folk 60c, 62c, 64c, 66c.

The shift folk 60c, 62c, 64c, 66c is fixed on a folk shaft (not shown). Detents (not shown) are provided at the folk shaft at positions corresponding to the neutral position and right and left gear-in (engaging) positions. When the shift folk 60c, 62c, 64c, 66c is at the neutral or gear-in position, the position is retained by the detent, thereby making hydraulic pressure supply unnecessary.

In the synch mechanism 60, 62, 64, 66, as shown in FIG. 2, the shift folk 60c, 62c, 64c, 66c is connected to a circular sleeve 60d, 62d, 64d, 66d. The inner periphery of the sleeve 60d, 62d, 64d, 66d accommodates a hub 60e, 62e, 64e, 66e that is spline-coupled to the first or second secondary input shaft 20, 22 to be movable in the axial direction.

The first-speed and third-speed drive gears 32, 34 are installed on either side of the hub 60e through a blocking ring 60f, the fifth-speed and seventh-speed drive gears 36, 38 on either side of the hub 62e through a blocking ring 62f, the second-speed and fourth-speed drive gears 40, 42 on either side of the hub 64e through a blocking ring 64f, and the sixth-speed and eighth-speed drive gears 44, 46 on either side of the hub 66e through a blocking ring 66f. Springs are each provided near the blocking rings 60f, 62f, 64f, 66f.

The blocking rings 60f, 62f, 64f, 66f are formed with splines while the associated drive gears are formed with dog teeth. Further, the blocking rings 60f, 62f, 64f, 66f are formed with tapered cones while the associated drive gears are formed with corresponding tapered cones.

Further explanation will be made taking the synch mechanism 60 as an example. Since it is configured as described above, when hydraulic pressure is supplied to one of the piston chambers, e.g., the third-speed piston chamber 60b so that the first-speed piston chamber 60a facing thereto and the piston rod connected to the piston chamber 60a are moved forward right in FIG. 2, the sleeve 60d connected to the piston rod through the shift folk 60c is moved in the same direction and contacts the spring to urge the blocking ring 60f toward the first-speed drive gear 32 through the spring.

When the sleeve 60d is moved further forward, the spline of the sleeve 60d contacts the spline of the blocking ring 60f and the tapered cone of the blocking ring 60d contacts the tapered cone of the gear 32, whereby torque is induced by the frictional force.

When the sleeve 60d is still further moved, the rotation of the sleeve 60d and that of gear 32 are synchronized due to the torque and the sleeve 60d is moved forward with its spline pushing the spline of the blocking ring 60f. Subsequently, when the torque disappears due to the synchronized rotation, the sleeve 60d is moved still further forward so that its spline is integrally engaged with the spline of the blocking ring 60f, and moved still further forward to be integrally engaged with the dog teeth of the gear 32. Thus the gear-in (engaging) condition is established.

The other synch mechanisms 62, 64, 66 are configured in the same manner. Specifically, when the sleeve 62d, 64d, 66d is axially moved (shifted) from the neutral position to the in-gear position, it is engaged with the dog teeth of corresponding one of the drive gears 36, 38, 40, 42, 44, 46 as synchronizing their rotation, so as to connect the drive gear 36, etc., to the first or second secondary input shaft 20, 22.

The line pressure of a hydraulic passage 80q regulated by controlling an amount of operating oil discharged from a pressure regulation port 80d1 of the regulator valve 80d, is sent to input ports of first to fifth (ON/OFF) solenoid valves (hydraulic control valves (electromagnetic valves)) 80r, 80s, 80t, 80u, 80v. Those solenoid valves 80r, 80s, 80t, 80u, 80v are N/C type ON/OFF solenoid valves in each of which a spool is displaced to the open position upon being supplied with current (being energized).

An output port of the first solenoid valve 80r is connected to an operating port 80j1 of the first clutch shift valve 80j to urge a spool 80j2 rightward (in the drawing) against urging force of a spring. An output port of the second solenoid valve 80s is connected to an operating port 80k1 of the second clutch shift valve 80k to urge a spool 80k2 rightward against urging force of a spring.

An output port of the third solenoid valve 80t is connected to an operating port 80n1 of the first servo shift valve 80n to urge a spool 80n2 rightward against urging force of a spring.

Similarly, an output port of the fourth solenoid valve 80u is connected to an operating port 80o1 of the second servo shift valve 80o to urge a spool 80o2 rightward, while an output port of the fifth solenoid valve 80v is connected to an operating port 80p1 of the third servo shift valve 80p to urge a spool 80p2 rightward.

Thus, the hydraulic pressure supply unit 80 energizes and deenergizes the linear solenoid such as the first linear solenoid valve 80f or the ON/OFF solenoid valve such as the first solenoid valve 80r so as to control the operations of the first and second clutches 24, 26 and the synch mechanisms 60 to 66.

In the illustrated dual clutch type automatic transmission T, hydraulic pressure is supplied to one of the synch mechanisms 60, 62, 64, 66 corresponding to the next (target) speed (more exactly, a next gear) to fasten it to the associated one of the first and second secondary input shafts 20, 22 (this operation is called the "pre-shift"). Next hydraulic pressure is discharged from one of the first and second clutches 24, 26 corresponding to the present speed while it is supplied to the other of the clutches 24, 26 (which is associated with the fastened secondary input shaft corresponding to the next speed) to engage (fasten) it to the relevant one of the first input shaft 14 and second input shaft 16, so that the speed is shifted or changed. The shifting is basically carried out alternately (continuously) between the odd-numbered speed (first, third, fifth and seventh speed) and the even-numbered speed (second, fourth, sixth and eighth speed).

Further, the hydraulic pressure supply unit 80 controls engagement and disengagement of the lockup clutch 12d of the torque converter by energizing and deenergizing some of the aforementioned valves and another linear solenoid valve, but the explanation thereon is omitted.

The explanation on FIG. 1 will be resumed. The transmission T has a shift controller 84. The shift controller 84 is constituted as an Electronic Control Unit (ECU) having a microcomputer. Further, an engine controller 86 similarly constituted as an ECU having a microcomputer is provided to control the operation of the engine 10.

The shift controller 84 is able to communicate with the engine controller 86 to acquire information including an engine speed, throttle opening, AP (Accelerator Pedal) opening, etc., therefrom.

A first rotational speed sensor 90 is installed near the even input shaft 14 to produce an output or signal indicative of an input rotational speed NM of the transmission T, while second, third and fourth rotational speed sensors 92, 94, 96 are installed at the first and second secondary input shafts 20, 22 and the output shaft 28, respectively, and each produces an output or signal indicative of a rotational speed of the associated shaft. A fifth rotational speed sensor 100 is installed near the drive shaft 74 to produce an output or signal indicative of a vehicle speed V.

First and second pressure sensors 102, 104 are installed at hydraulic passages connected to the first and second clutches 24, 26 of the hydraulic pressure supply unit 80 to produce outputs or signals indicative of pressure (hydraulic pressure) of the operating oil ATF to be supplied to the first and second clutches 24, 26, respectively. A temperature sensor 106 is installed near the reservoir 80a to produce an output or signal indicative of oil temperature TATF (temperature of the operating oil ATF).

A range selector position sensor 110 is provided near a range selector (not shown) installed at the operator's seat of the vehicle 1 and produces an output or signal indicative of a range selected from among D, P, R and N through manipulation by the operator.

The outputs of the above sensors are all sent to the shift controller 84. Based on the sensor outputs and information acquired by communicating with the engine controller 86, the shift controller 84 energizes and deenergizes the third and fourth linear solenoid valves 80h, 80i, etc., to control the operation of the transmission T, more exactly, the operations of the synch mechanisms 60 to 66.

Thus, this embodiment has the speed selecting mechanisms equipped with the eight (a plurality of) speeds including first to eight speeds that can be constituted by four sets (more precisely, that are to be established through the first-speed drive gear 32 to the seventh-eighth speed driven gear 54), and with the first-third synch mechanism 60, second-fourth synch mechanism 62, fifth-seventh synch mechanism 64 and sixth-eighth synch mechanism 66 corresponding to the four sets, each of which is operated upon being supplied with hydraulic pressure so that it is moved from the neutral position to select one speed of the corresponding set and engage a gear of the corresponding speed to the relevant one of the first and second secondary input shafts 20, 22 and output shaft 28 (more exactly, the first and second secondary input shafts 20, 22).

Assuming the eight speeds as seven speeds (more exactly, eight speeds) among the first speed (A), second speed (B), third speed (C), fourth speed (D), fifth speed (E), sixth speed (F), seventh speed (G) and eighth speed (H) in order of gear ratio from large to small, they are constituted by the four sets, as follows: a first set of the first speed (A) having the largest gear ratio and the third speed (C) that is next speed but one (a set corresponding to the first-third speed synch mechanism 60); a second set including at least the eighth speed (H) having the smallest gear ratio (more exactly, the eighth speed (H) and sixth speed (F) that is next speed but one) (a set corresponding to the sixth-eighth speed synch mechanism 66); a third set of the second speed (B) and the fourth speed (D) positioned between two speeds of the first set (a set corresponding to the second-fourth speed synch mechanism 64); and a fourth set including two of the fifth speed (E), sixth speed (F) and seventh speed (G) (more exactly, the fifth speed (E) and seventh speed (G)) positioned between speeds of the second and third sets (a set corresponding to the fifth-seventh speed synch mechanism 62). One of the fourth and third linear solenoid valves 80i, 80h, i.e., the fourth linear solenoid valve 80i selectively supplies hydraulic pressure to the first-third speed synch mechanism 60 and sixth-eighth speed synch mechanism 66 corresponding to the first and second sets, while the other thereof, i.e., the third linear solenoid valve 80h selectively supplies hydraulic pressure to the second-fourth speed synch mechanism 64 and fifth-seventh speed synch mechanism 62 corresponding to the third and fourth sets.

Since this embodiment is configured as mentioned above, i.e., since it is configured to constitute the speeds not by the odd-number sets such as a set of the first, third, . . . speeds and the even-number sets such as a set of the second, fourth, . . . speeds as in '800, but by a set having the largest and smallest speeds in terms of gear ratio and a set having middle speeds therebetween. Therefore, when the gear position is, after changed from the eighth speed to the seventh speed continuously, skipped to the fourth speed, or when it is, after changed from the seventh speed to the sixth speed continuously, skipped to the third speed, the pre-shift operations of the odd-numbered (or even-numbered) speeds can be continuously conducted through the fourth and third linear solenoid valves 80$i$, 80$h$, thereby enabling to shorten the time period required for shifting.

Figure 3:
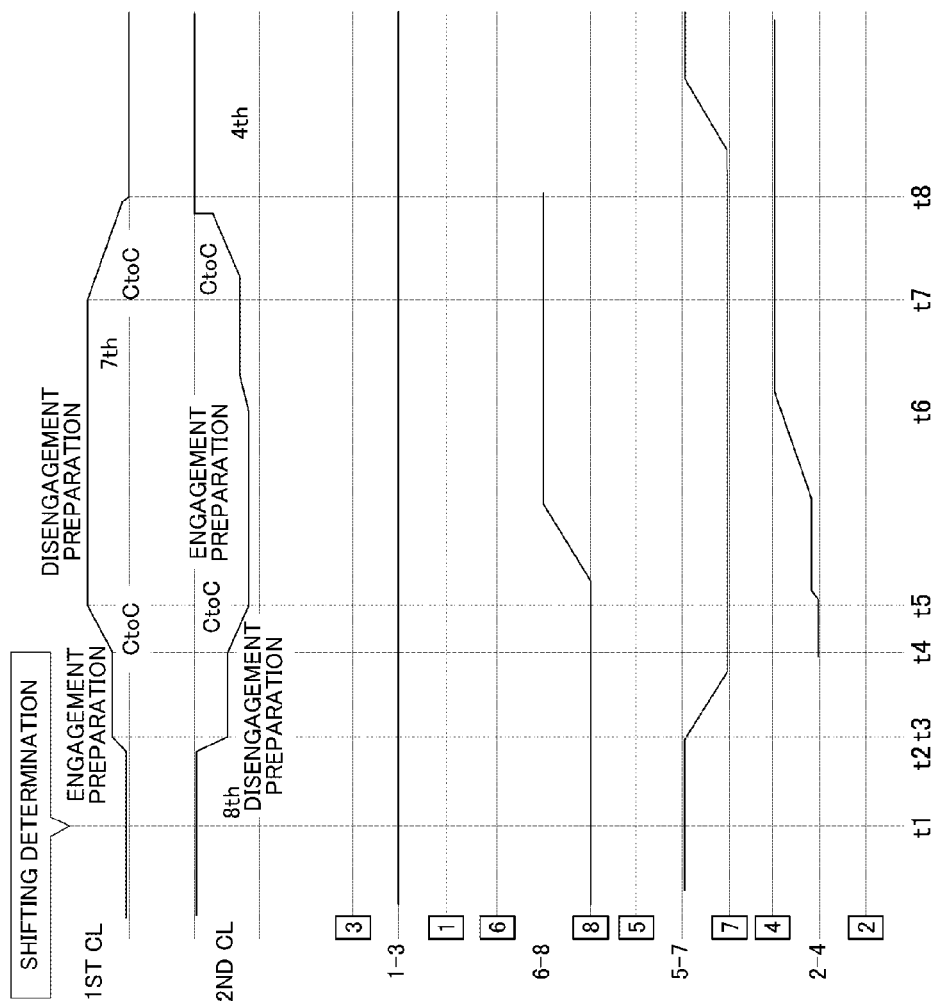
FIG. 3 is a time chart showing the operation of the apparatus shown in FIG. 1.
Figure 4:
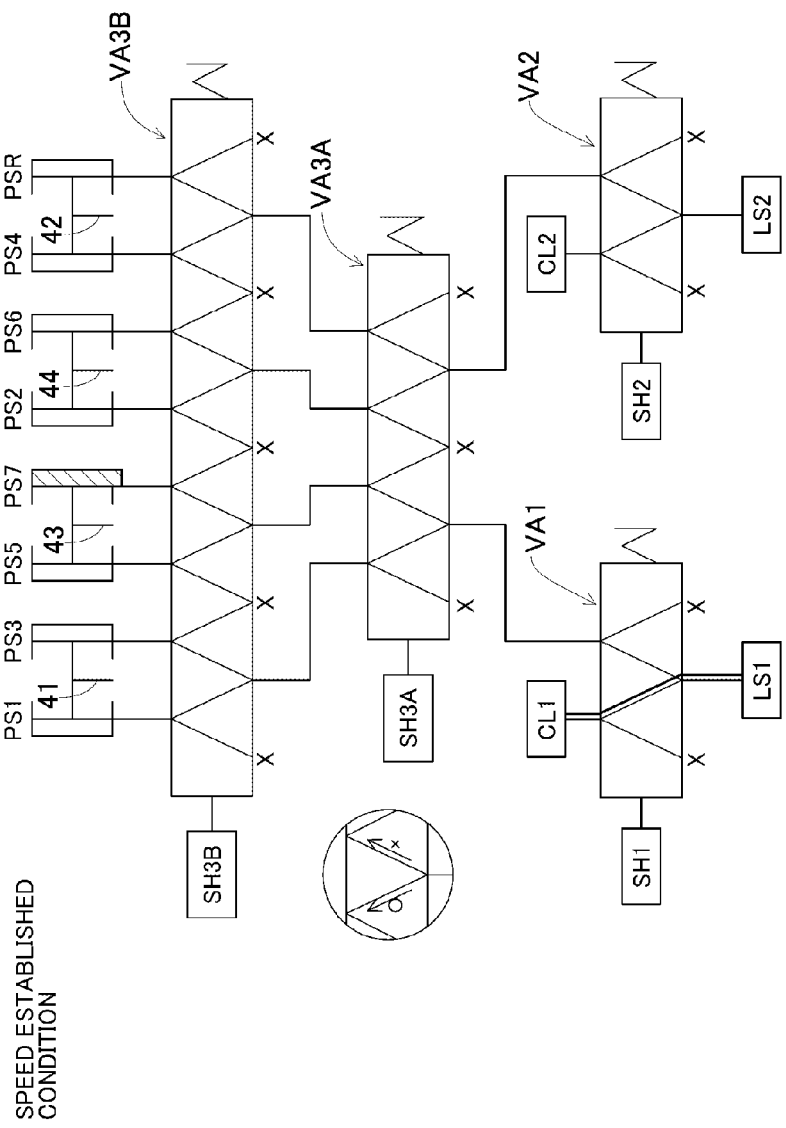
FIG. 4 is an explanatory view showing the operation of the reference's technique.
Figure 5:
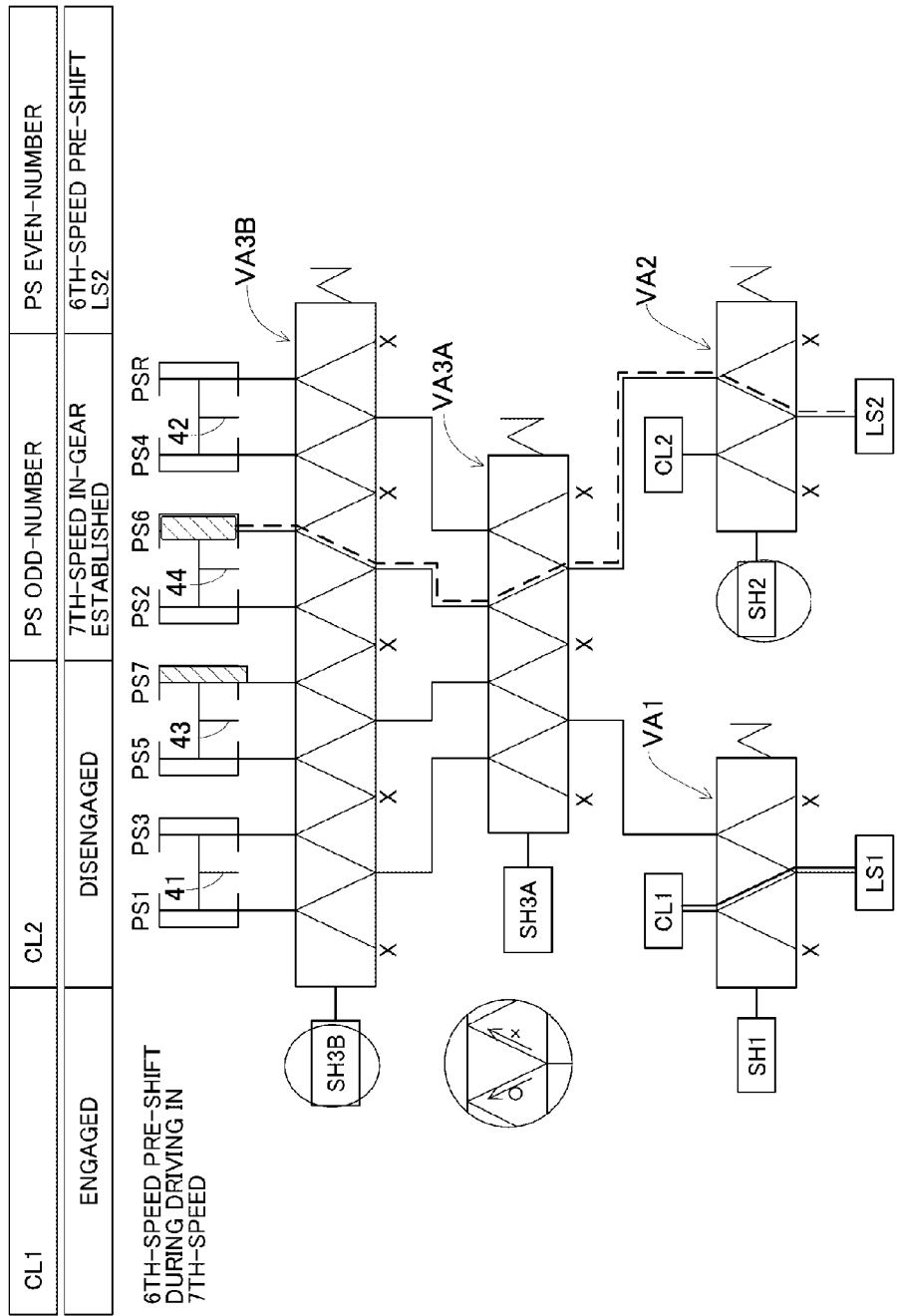
FIG. 5 is an explanatory view similarly showing the operation of the reference's technique.
Figure 6:
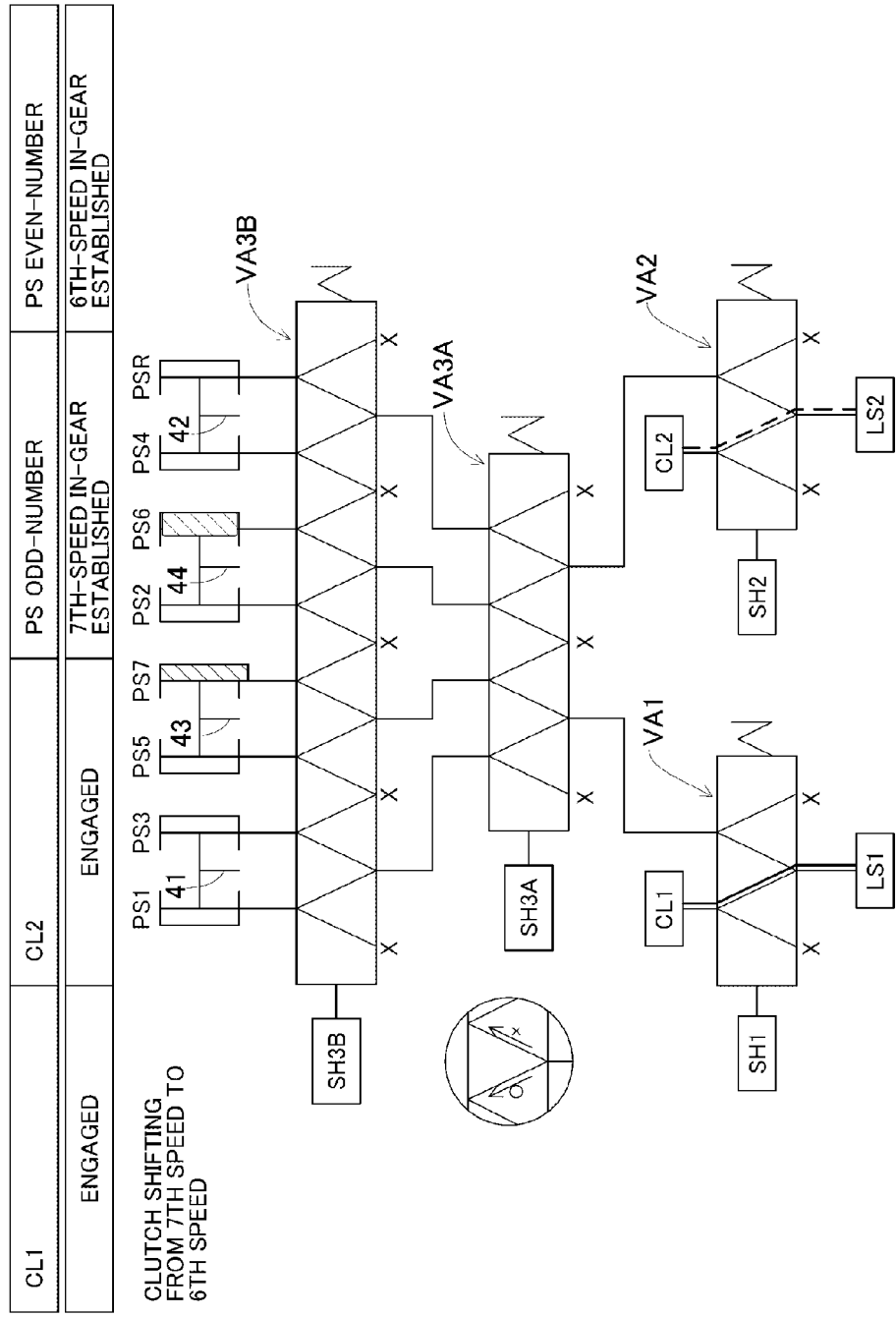
FIG. 6 is an explanatory view similarly showing the operation of the reference's technique.
Figure 7:
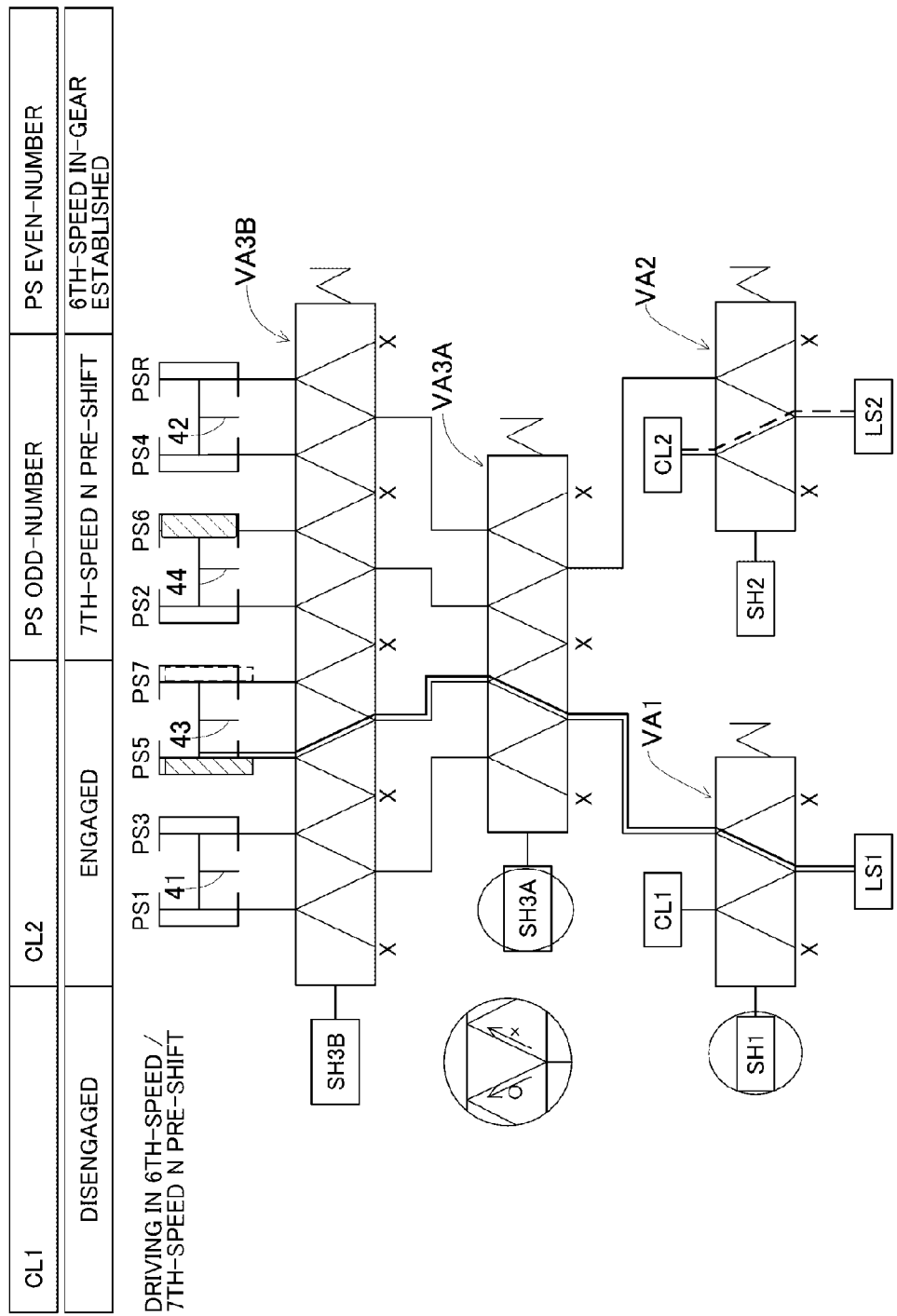
FIG. 7 is an explanatory view similarly showing the operation of the reference's technique.
Figure 8:
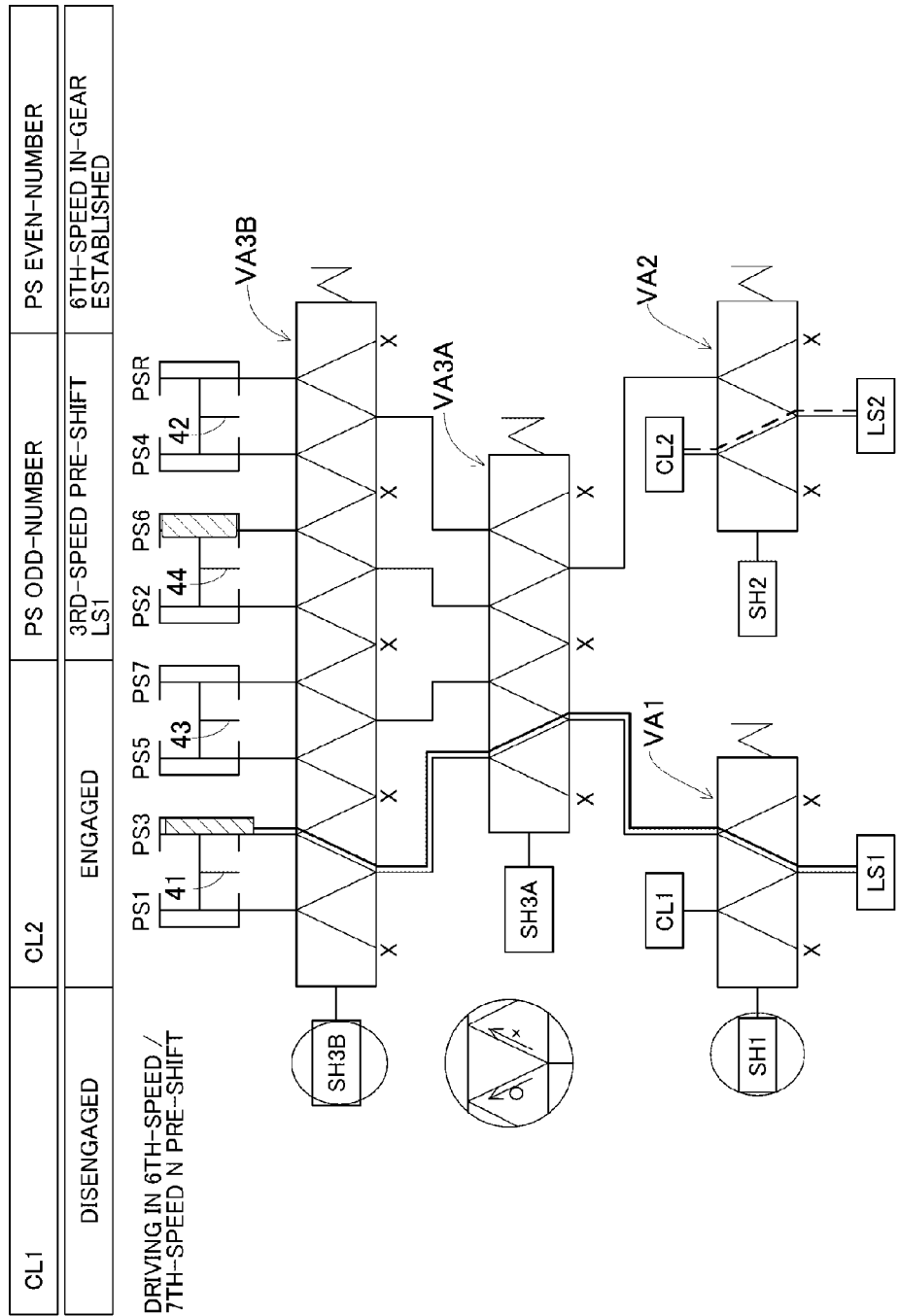
FIG. 8 is an explanatory view similarly showing the operation of the reference's technique.
Figure 9:
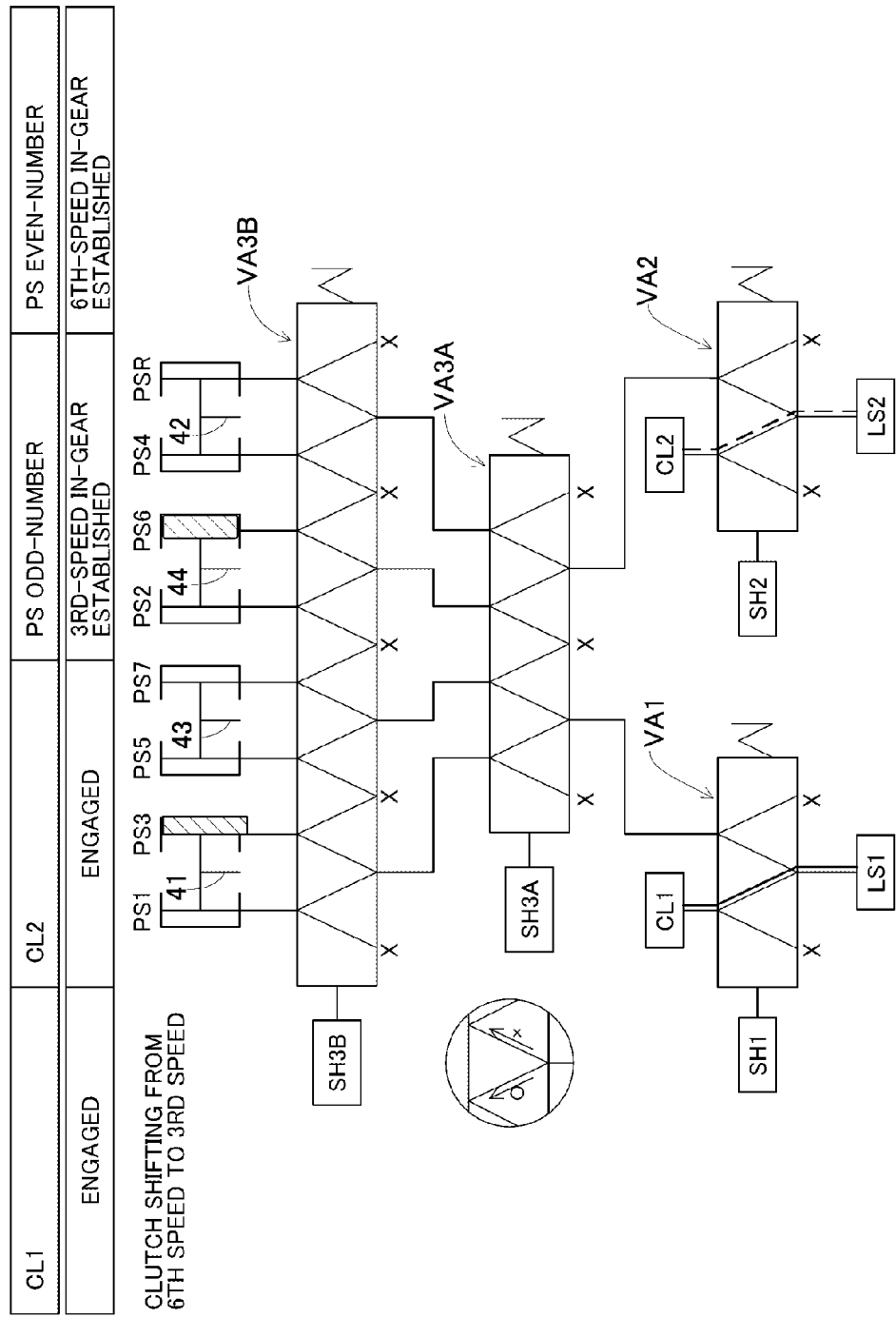
FIG. 9 is an explanatory view similarly showing the operation of the reference's technique.

FIG. 3 is a time chart showing the operation of the shift controller 84. The explanation will be made with reference to this figure. It is assumed that, at the time t1, a shifting map is retrieved using the vehicle speed V and accelerator opening AP and the determination to shift from the eighth speed to the seventh speed is made.

At the time t2, the preparation for disengaging the second clutch 26 through the second linear solenoid valve 80$g$ is started, while the preparation for engaging the first clutch 24 through the first linear solenoid valve 80$f$ is started.

Next, at the time t3, the supply of hydraulic pressure to the fifth-seventh speed synch mechanism 62 is started through the third linear solenoid valve 80$h$, so that the pre-shift to the seventh speed is started. At the time t4, the pre-shift is completed. At the time t4, about half of the hydraulic pressure is discharged from the second clutch 26 so that the clutch 26 is in the process of disengagement, while about one-third of the hydraulic pressure is supplied to the first clutch 24 so that the clutch 24 is in the process of engagement.

Note that, in FIG. 3, "6-8" indicates the neutral position of the sixth-eighth speed synch mechanism 66, "5-7" indicates that of the fifth-seventh speed synch mechanism 62, and "2-4" indicates that of the second-fourth speed synch mechanism 64.

At the time t5, the second clutch 26 is almost fully disengaged and the first clutch 24 is fully engaged. Accordingly, the pre-shift to the eighth speed is needed to be conducted by the sixth-eighth speed synch mechanism 66 through the fourth linear solenoid valve 80$i$, and it is assumed that, at this time, shifting determination aiming at the pre-shift to the fourth speed is made.

In this case, in the technique of '800, since the operations of the sixth-eighth speed synch mechanism 66 and the second-fourth speed synch mechanism 64 on the even-numbered speed side are both controlled by the same second linear solenoid valve (LS2), it is impossible to supply hydraulic pressure to the sixth-speed piston chamber 66$a$ to move (pre-shift) the piston rod from the eighth-speed detent position to the N (neutral) position in the sixth-eighth speed synch mechanism 66, as supplying hydraulic pressure to the fourth-speed piston chamber 64$b$ to move (pre-shift) the piston rod to the fourth-speed position in the second-fourth speed synch mechanism 64 at the same time. Therefore, the shifting is delayed by that time accordingly.

In contrast, in this embodiment, as explained above, hydraulic pressure to be supplied to the synch mechanism 66 related to the eighth speed is controlled by the fourth linear solenoid valve 80$i$ while that to the synch mechanism 64 related to the fourth speed is controlled by the third linear solenoid valve 80$h$.

As a result, as shown in the time chart of FIG. 3, during a period between the time t5 and the time t6, the pre-shift to the sixth speed by the sixth-eighth speed synch mechanism 66 through the fourth linear solenoid valve 80$i$ and the pre-shift to the fourth speed by the second-fourth speed synch mechanism 64 through the third linear solenoid valve 80 can be concurrently conducted.

At the time t6, hydraulic pressure supply to the second clutch 26 is resumed. To be specific, although the second clutch 26 should have been fully disengaged at the time t5, since the shifting determination to the fourth speed was made, the hydraulic pressure was not completely discharged, so that the hydraulic pressure supply is resumed at the time t6.

Then at the time t7, hydraulic pressure is started to be discharged from the first clutch 24 related to the seventh speed and at the time t8, the first clutch 24 is fully disengaged while the second clutch 26 related to the fourth speed is fully engaged.

Although not illustrated, the same process can be applied to the case where the gear position is, after changed from the seventh speed to the sixth speed continuously, skipped to the third speed. Specifically, in the technique of '800 shown in FIGS. 4 to 10, when the pre-shift operations of the odd-numbered speeds or even-numbered speeds are continuously conducted, it makes impossible to concurrently conduct the operation (energizing) of the first linear solenoid valve (LS1) as shown in FIG. 10 and therefore, it takes additional time to shift a gear accordingly. However, this disadvantage can be eliminated in this embodiment, thereby enabling to shorten the time period required for shifting.

As stated above, the embodiment is configured to have a control apparatus for an automatic transmission (T) having first and second input shafts (odd-numbered speed input shaft 16 and first secondary input shaft 20; even-numbered speed input shaft 14 and second secondary input shaft 22) connected to a prime mover (engine 10) mounted on a vehicle (1) through first and second clutches (24, 26); at least one output shaft (28) installed in parallel with the first and second input shafts; a plurality of speeds (gears corresponding thereto (first-speed drive gear 32 to eighth speed drive gear 46, first-second speed driven gear 48 to seventh-eighth speed driven gear 54, RVS idle gear 56)) that are installed between the first and second input shafts and the output shaft and are constituted by at least four sets; speed selecting mechanisms (synchronizing mechanisms 60, 62, 64, 66) provided to correspond to the four sets, each of which is operated upon being supplied with hydraulic pressure to select one of the speeds so that it is moved from a neutral position to select one speed of a set corresponding thereto and engage the selected speed to one of the first and second input shafts and the output shaft; and a hydraulic pressure supply control unit (hydraulic pressure supply control unit 80, shift controller 84) including first and second pressure regulators (fourth and third linear solenoid valves 80$i$, 80$h$) interposed at a hydraulic pressure circuit connecting a hydraulic pressure source (hydraulic pump 80) to the speed selecting mechanisms and adapted to selectively supply hydraulic pressure to the speed selecting mechanisms to move them to transmit an output of the prime mover from the first and second input shafts to the output shaft through the selected speed, wherein the improvement comprises that: assuming that the plurality (eight) of the speeds as seven speeds among eight speeds of A (first speed), B (second speed), C (third speed), D (fourth speed), E (fifth speed), F (sixth speed), G (seventh speed) and H (eighth speed) in order of gear ratio from large to small, the four sets are constituted by a first set of A (first speed) having a largest gear ratio and C (third speed) that is next speed but one (a set corresponding to the first-third speed synch mechanism 60); a second set including at least H (eighth speed) having a smallest gear ratio (more exactly, H (eighth speed) and F (sixth speed) that is next speed but one) (a set corresponding to the sixth-eighth speed synch mechanism 66); a third set of B (second speed) and D (fourth speed) positioned between two of the first set (a set corresponding to the second-fourth speed synch mechanism 64); and a fourth set including two of E (fifth speed), F (sixth speed) and G (seventh speed) positioned between the second and third sets (a set corresponding to the fifth-seventh speed synch mechanism 62), and one of the first and second pressure regulators selectively supplies hydraulic pressure to two (60, 66) of the speed selecting mechanisms corresponding to the first and second sets, while the other thereof selectively supplies hydraulic pressure to two (64, 62) of the speed selecting mechanisms corresponding to the third and fourth sets.

In other words, since it is configured to constitute the speeds not by the odd-number sets such as a set of the first, third, . . . speeds and the even-number sets such as a set of the second, fourth, . . . speeds as in '800, but by a set having the largest and smallest speeds in terms of gear ratio and a set having middle speeds therebetween. Therefore, when the gear position is, after changed from the eighth speed to the seventh speed continuously, skipped to the fourth speed, or when it is, after changed from the seventh speed to the sixth speed continuously, skipped to the third speed, the pre-shift operations of the odd-numbered (or even-numbered) speeds can be continuously conducted through the fourth and third linear solenoid valves 80*i*, 80*h* (first and second pressure regulators), thereby enabling to shorten the time period required for shifting.

In the apparatus, assuming that the plurality of the speeds as eight speeds of A (first speed), B (second speed), C (third speed), D (fourth speed), E (fifth speed), F (sixth speed), G (seventh speed) and H (eighth speed) in order of gear ratio from large to small, the four sets are constituted by a first set of A (first speed) having a largest gear ratio and C (third speed) that is next speed but one; a second set of H (eighth speed) having a smallest gear ratio and F (sixth speed) that is next speed but one; a third set of B (second speed) and D (fourth speed) positioned between two of the first set; and a fourth set of E (fifth speed) and G (seventh speed) positioned between the second and third sets.

With this, in addition to the above effects, when the gear position is shifted, the pre-shift operations of the odd-numbered (or even-numbered) speeds can be continuously conducted through the fourth and third linear solenoid valves 80*i*, 80*h* more smoothly, thereby enabling to shorten the time period required for shifting.

In the apparatus, the hydraulic pressure supply control unit includes a first group of shift valves (second clutch shift valve 80*k*, first and third servo shift valves 80*n*, 80*p*) and a second group (first clutch shift valve 80*j*, first and second servo shift valves 80*n*, 80*o*) of shift valves having at least one shared shift valve (first servo shift valve 80*n*) with the first group, each of the shift valves being interposed at the hydraulic pressure circuit and connected to an electromagnetic valve (first to fifth solenoid valves 80*r*, 80*s*, 80*t*, 80*u*, 80*v*), and one (fourth linear solenoid valve 80*i*) of the first and second pressure regulators selectively supplies hydraulic pressure to two (60, 66) of the speed selecting mechanisms corresponding to the first and second sets through the first group, while the other (third linear solenoid valve 80*h*) thereof selectively supplies hydraulic pressure to two (64, 62) of the speed selecting mechanisms corresponding to the third and fourth sets through the second group. With this, in addition to the above effects, it becomes possible to supply hydraulic pressure to the synch mechanisms 60 to 66 corresponding to four sets of speeds with simple structure and improve hydraulic pressure response.

In the apparatus, the hydraulic pressure supply control unit including third and fourth pressure regulators (first and second linear solenoid valves 80*f*, 80*g*) interposed at a hydraulic pressure circuit connecting the hydraulic pressure source to the first and second clutches and adapted to selectively supply hydraulic pressure to the first and second clutches to engage them to connect the output of the prime mover with the first and second input shafts, and each of the third and fourth pressure regulators supplies hydraulic pressure to one of the first and second clutches through at least one shift valve (first and second clutch shift valves 80*j*, 80*k*) of the first and second groups.

With this, in addition to the above effects, since the first and second linear solenoid valves 80*f*, 80*g* are not used to control the operations of the first and second clutches 24, 26 in addition to the operations of the synch mechanisms 60 to 66, it becomes possible to shorten the time period required for shifting. Further, the first and second linear solenoid valves 80*f*, 80*g* provided for controlling the operations of the first and second clutches 24, 26, independently of the operations of the synch mechanisms 60 to 66, so that the hydraulic pressure response is further improved.

In the apparatus, the plurality of the speeds of A, B, C, D, E, F, G and H includes a first speed, second speed, third speed, fourth speed, fifth speed, sixth speed, seventh speed and eighth speed. Specifically, one of the first and second pressure regulators (fourth and third linear solenoid valves 80*i*, 80*h*), i.e., the fourth linear solenoid valve 80*i* selectively supplies hydraulic pressure to one of the speed selecting mechanisms corresponding to a set including the first speed (largest gear ratio) and the eighth speed (smallest gear ratio), while the other thereof, i.e., the third linear solenoid valve 80*h* selectively supplies hydraulic pressure to others of the speed selecting mechanisms corresponding to a third set including the second and fourth speeds and a fourth set including the fifth, sixth and seventh speeds. With this, in addition to the above effects, when the gear position is, after changed from the eighth speed to the seventh speed continuously, skipped to the fourth speed, or when it is, after changed from the seventh speed to the sixth speed continuously, skipped to the third speed, the pre-shift operations of the odd-numbered (or even-numbered) speeds can be continuously conducted through the first and second pressure regulators more smoothly, thereby enabling to shorten the time period required for shifting.

It should be noted that, in the foregoing, although the dual clutch type automatic transmission is explained, it is not limited to the exemplification above and any configuration can be applied.

It should also be noted that, although the engine (internal combustion engine) is exemplified as the prime mover, it may be hybrid combining the engine and an electric motor, or only the motor may be used.

Japanese Patent Application No. 2012-054511 filed on Mar. 12, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A control apparatus for an automatic transmission having first and second input shafts connected to a prime mover mounted on a vehicle through first and second clutches; at least one output shaft installed in parallel with the first and second input shafts; a plurality of speeds that are installed between the first and second input shafts and the output shaft and are constituted by at least four sets; speed selecting mechanisms provided to correspond to the four sets, each of which is operated upon being supplied with hydraulic pressure to select one of the speeds so that each of the speed selecting mechanisms is moved from a neutral position to select one speed of a set corresponding thereto and engage the selected speed to one of the first and second input shafts and the output shaft; and a hydraulic pressure supply control unit including first and second pressure regulators interposed at a hydraulic pressure circuit connecting a hydraulic pressure source to the speed selecting mechanisms and adapted to selectively supply hydraulic pressure to the speed selecting mechanisms to move them to transmit an output of the prime mover from the first and second input shafts to the output shaft through the selected speed, wherein the improvement comprises that:

assuming that the plurality of the speeds as seven speeds among eight speeds of A, B, C, D, E, F, G and H in order of gear ratio from large to small, the four sets are constituted by a first set of A having a largest gear ratio and C that is next speed but one; a second set including at least H having a smallest gear ratio; a third set of B and D positioned between two of the first set; and a fourth set including two of E, F and G positioned between the second and third sets, and one of the first and second pressure regulators selectively supplies hydraulic pressure to two of the speed selecting mechanisms corresponding to the first and second sets, while the other thereof selectively supplies hydraulic pressure to two of the speed selecting mechanisms corresponding to the third and fourth sets.

2. The apparatus according to claim 1, wherein, assuming that the plurality of the speeds as eight speeds of A, B, C, D, E, F, G and H in order of gear ratio from large to small, the four sets are constituted by the first set of A having the largest gear ratio and C that is next speed but one; the second set of H having the smallest gear ratio and F that is next speed but one; the third set of B and D positioned between two of the first set; and the fourth set of E and G positioned between the second and third sets.

3. The apparatus according to claim 1, wherein the hydraulic pressure supply control unit includes a first group of shift valves and a second group of shift valves having at least one shared shift valve with the first group, each of the shift valves being interposed at the hydraulic pressure circuit and connected to an electromagnetic valve, and one of the first and second pressure regulators selectively supplies hydraulic pressure to two of the speed selecting mechanisms corresponding to the first and second sets through the first group, while the other thereof selectively supplies hydraulic pressure to two of the speed selecting mechanisms corresponding to the third and fourth sets through the second group.

4. The apparatus according to claim 1, wherein the hydraulic pressure supply control unit including third and fourth pressure regulators interposed at a hydraulic pressure circuit connecting the hydraulic pressure source to the first and second clutches and adapted to selectively supply hydraulic pressure to the first and second clutches to engage the first and second clutches to connect the output of the prime mover with the first and second input shafts, and each of the third and fourth pressure regulators supplies hydraulic pressure to one of the first and second clutches through at least one shift valve of the first and second groups.

5. The apparatus according to claim 1, wherein the plurality of the speeds of A, B, C, D, E, F, G and H includes a first speed, second speed, third speed, fourth speed, fifth speed, sixth speed, seventh speed and eighth speed.

* * * * *